United States Patent [19]

Johansson

[11] Patent Number: 4,854,447
[45] Date of Patent: * Aug. 8, 1989

[54] BELT CONVEYOR SYSTEM

[76] Inventor: Rolf Johansson, Föreningsgatan 13, S-703 63 Örebro, Sweden

[ * ] Notice: The portion of the term of this patent subsequent to Apr. 19, 2005 has been disclaimed.

[21] Appl. No.: 182,498

[22] Filed: Apr. 18, 1988

Related U.S. Application Data

[63] Continuation-in-part of Ser. No. 923,145, Oct. 14, 1986, Pat. No. 4,738,353.

[30] Foreign Application Priority Data

Feb. 14, 1985 [SE] Sweden ............................ 8500683

[51] Int. Cl.⁴ ............................................ B65G 15/10
[52] U.S. Cl. .................................... 198/817; 198/840; 198/842
[58] Field of Search ............... 198/817, 839, 840, 842, 198/836, 861.1

[56] References Cited

U.S. PATENT DOCUMENTS

| | | | |
|---|---|---|---|
| 2,573,486 | 10/1951 | Pollitz | 198/842 |
| 2,698,079 | 12/1954 | Wearly | 198/840 X |
| 2,705,854 | 4/1955 | Laverdisse | 198/840 X |
| 3,225,902 | 12/1965 | Roinestad | 198/842 X |
| 3,598,226 | 8/1971 | Hayman | 198/817 |
| 4,013,165 | 3/1977 | Bush | 198/817 |
| 4,274,529 | 6/1981 | Mori et al. | 198/817 X |
| 4,366,900 | 1/1983 | Johansson | 198/817 X |
| 4,738,353 | 4/1988 | Johansson | 198/817 |

FOREIGN PATENT DOCUMENTS 888059 1/1962 United Kingdom ............... 198/817

*Primary Examiner*—Robert J. Spar
*Assistant Examiner*—D. Glenn Dayoan
*Attorney, Agent, or Firm*—Dennison, Meserole, Pollack & Scheiner

[57] ABSTRACT

A belt conveyor with dual upper runs and dual lower runs defined by a single continuous belt for synchronized movement of the upper runs. The dual lower runs cross each other and are guided by longitudinally spaced support rollers which twist the lower belt runs and vertically shift at least one of these lower runs to provide for free unencumbered crossing of the lower belt runs and the keepers mounted on the belt to assist in movement of material.

6 Claims, 9 Drawing Sheets

BELT CONVEYOR SYSTEM

This is a continuation-in-part of Application Ser. No. 06/923,145, filed Oct. 14, 1986, now U.S. Pat. No. 4,738,353 in the name of Rolf Johansson.

BACKGROUND OF THE INVENTION

The present invention relates to means in belt conveyors, primarily intended to achieve synchronization of the load-carrying belt runs.

The invention is concerned with light conveyors of the type heretofore having two belts running in parallel. Such a conveyor has such low weight that it can be moved and erected in working position by one or at most two men and is particularly adaptable for handling building material such as roof tiles at building sites.

Such belts require rather elaborate electrical and/or mechanical systems for ensuring a synchronization of the two belts for ensuring a proper support and movement of goods thereby.

SUMMARY OF THE INVENTION

A principal object of the present invention is to provide a low weight conveyor which utilizes two parallel belt runs as the materials receiving and conveying surface without the elaborate means heretofore required to maintain synchronization of the belt runs.

More particularly, the present invention utilizes a single belt configured through a series of intermediate support rollers along the length thereof, to define two parallel laterally spaced upper belt runs which define the material support surface, and lower belt runs which cross each other at an intermediate point along the length of the conveyor. In this manner, both the dual upper runs and the dual lower runs are defined by a single belt which assures synchronization of movement of the load-supporting upper belt runs.

It is proposed that the belt, in order to facilitate movement of material thereby, include projecting keepers which engage behind the goods. In order to ensure a proper passover of the lower belt runs without interference from the keepers, the lower runs are vertically spaced from each other at the crossing area and so twisted or oriented as to direct the keepers of the two belt runs outward relative to each other, thus avoiding any possibility of the keepers of one belt engaging the other belt or the keepers thereof.

DESCRIPTION OF PREFERRED EMBODIMENTS

Figure 1:
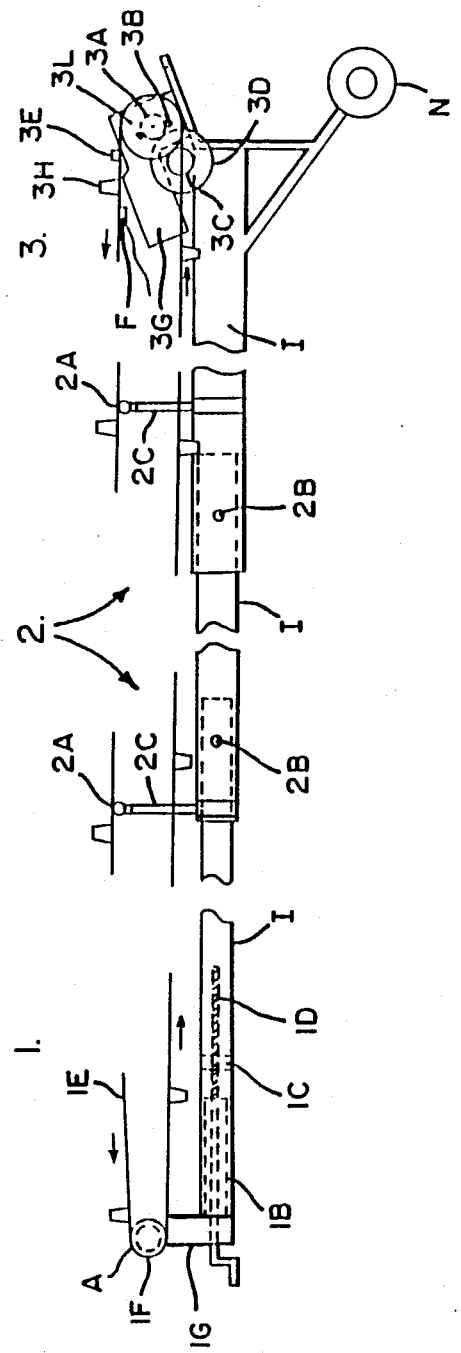
FIG. 1 shows a conveyor according to the prior art seen from the side.
Figure 2A:
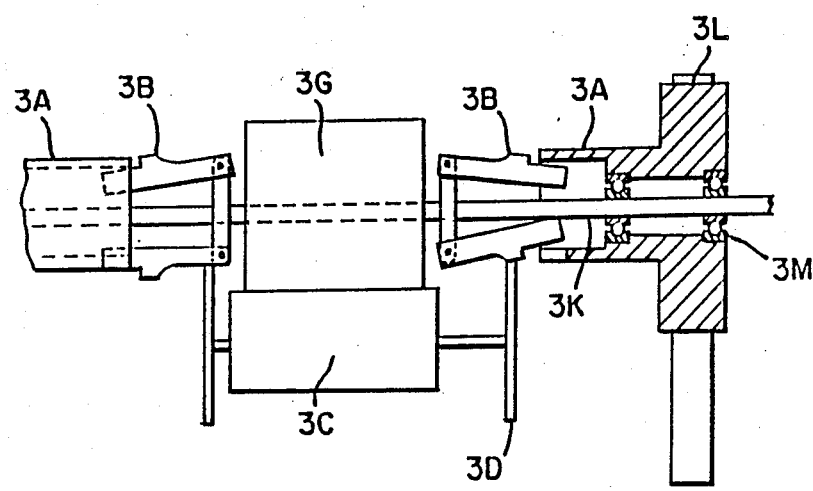
FIGS. 2A, 2B and 2C show examples of the prior art conveyor and components thereof.
Figure 2B:
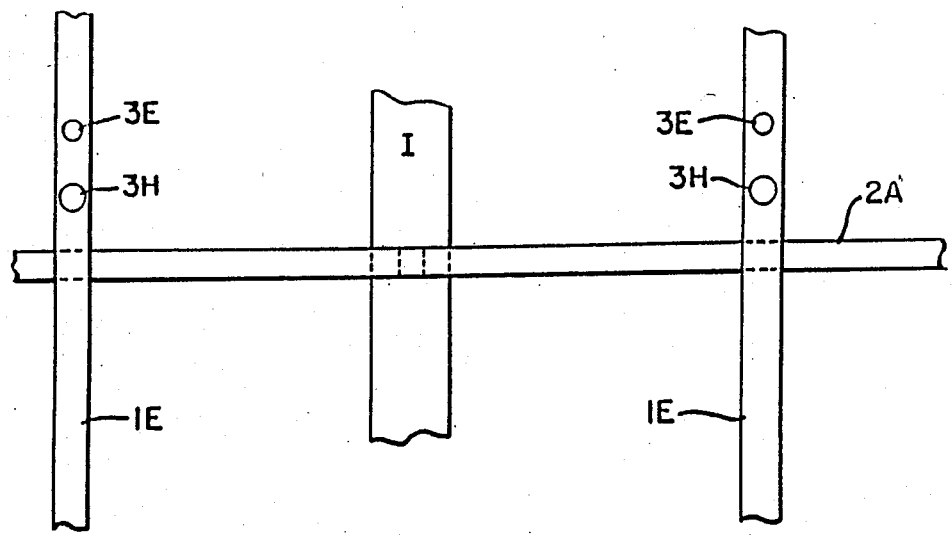
Figure 2C:
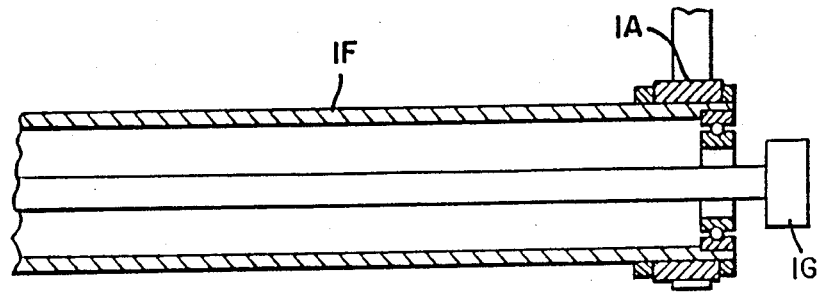
Figure 3:
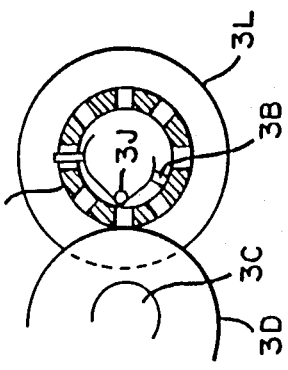
FIG. 3 shows an axial view of a connection according to FIG. 2.

FIGS. 1-3 illustrate the prior art as generally presented in U.S. Pat. No. 4,366,900 issued to Rolf Johansson on Jan. 4, 1983. FIG. 1 shows the conveyor from the side. For the sake of clarity, the figure has been cut and contracted. The figure thus falls into three divisions: the ends 1 and 3 and the middle part 2. Various components have been denoted by A, B, C and so on. The conveyor is constructed around the central body I, consisting of the three parts which can be telescoped into each other to facilitate transport from one site to another. When extended, the three parts are locked in relation to each other with the aid of pins or bolts 2B.

As can also be seen from FIG. 2, two parallel belts 1E run over guide rollers 1F and 3L at the ends of the conveyor. To enable driving of the belts, the guide roller 1F, which is not driven, is arranged on a bracket 1G located on a pipe 1B protruding into the body I. With the aid of a screw 1D running in a nut 1C in the body, the bracket 1G can be moved in one direction or the other. Other brackets 2C with support rollers 2A for the upper sections of the belts are provided at suitable intervals along the body. A number of feeders 3H are also provided on the belts 1E to feed the load units along. These feeders may be in the form of very simple rubber studs or the like. The belts may consist of strong, relatively narrow strips of nylon, for instance, some five to ten centimeters in width.

The belts are driven by guide rollers 3L at the right-hand end of FIG. 1. These guide rollers are in turn driven by a motor 3G with suitable ratio. The guide rollers are located on the driving shaft 3K from the motor, but can rotate quite freely thanks to ball-bearings 3M. They are driven individually by one of the jaws 3B in a jaw clutch, the other part of which is in a cylindrical sleeve 3A on the guide roller 3L. The principle can be seen more clearly in FIG. 3 showing an axial view of the connection.

As is evident from FIGS. 2 and 3, the sleeve 3A is divided into a number of teeth between which the jaws 3B can engage. The jaws are located on a transverse arm secured to the driving shaft 3K. The jaws 3B are also located in relation to each other and to the pitch of the teeth in the sleeve 3A so that only one jaw can be engaged between these teeth at a time. A spring 3J between the jaws presses these apart from each other and in between the teeth.

The jaw clutches are controlled by a double-acting electromagnet 3C whose armature on the ends is provided with circular discs 3D. When the armature is driven in one direction or the other, one of these discs will influence keepers on the jaws 3B which are thus forced out of engagement with the teeth on the sleeve 3A. The magnet 3C is controlled by indicators 3E on the belts 1E. These indicators may consist of small permanent magnets fitted equidistant from feeders 3H on the belts. It is thus possible to determine whether the feeders on the two belts remain immediately opposite each other.

Obviously, this can never be the case since it is impossible to manufacture the guide rollers 3L so exactly alike that the two belts always move exactly synchronously. However, by momentarily releasing one or the other of the jaw clutches 3A, 3B, the corresponding belt can be stopped briefly until the other belt catches up. This is achieved by the indicators 3E influencing the magnetic contacts 3F located somewhere on the body I where they will be passed by the indicators. It can also be seen in FIG. 1 that the conveyor can be provided with wheels N at one end to facilitate transport.

The objective of the present invention, as with the belt conveyor described above, is to achieve synchronized movement of the parts of the belt moving in parallel. However, it differs in that synchronization is achieved by the use of a single belt which is permitted to cross over. The entire construction is thus greatly simplified while ensuring high reliability.

Figure 4:
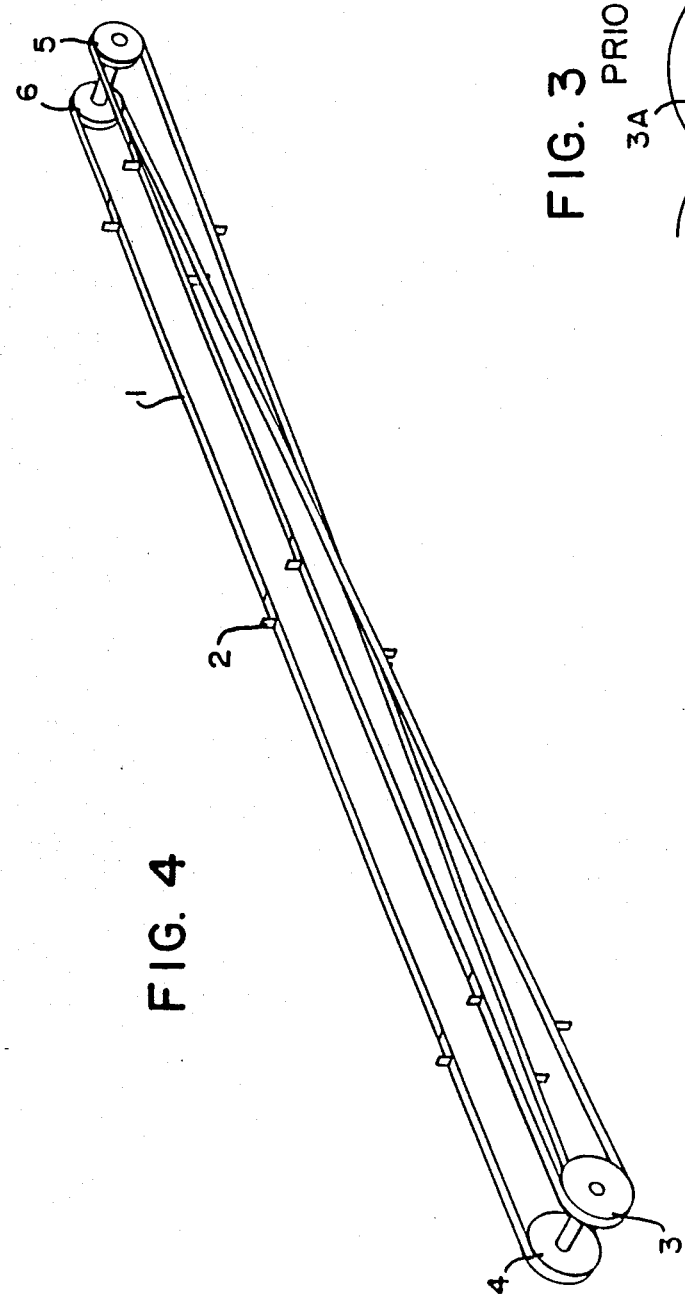
FIG. 4 shows the arrangement of the belt.
Figure 5:
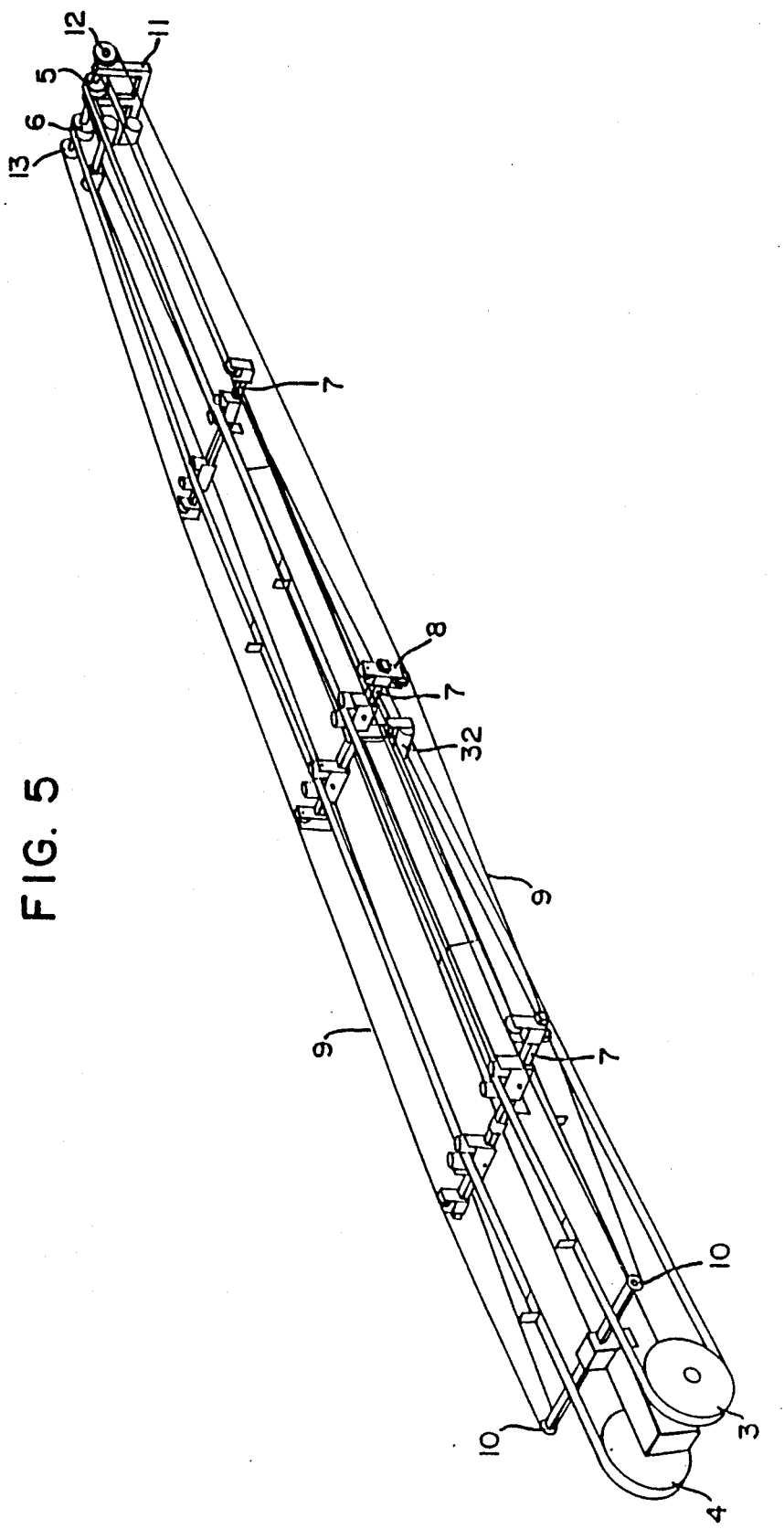
FIG. 5 gives a more complete picture of the belt and support cables.

The invention will be described in more detail with reference to FIGS. 4–8. In these figures, 1 denotes a belt with feeders 2 projecting from the carrying surface of the belt. As can be seen in FIGS. 4–5, the belt 1 is crossed on the lower side of the conveyor. The two coplanar parallel sections of the belt on the upper side are thus synchronized. The belt 1 is driven by driving rollers 3–4 and runs over guide rollers 5–6.

Supports 7 are arranged for support rollers. The support rollers 8 are intended to hold down the cables 9. Several rollers 8 may be arranged. The cables 9 are intended to support particularly wide loads. They are driven by the load alone and run over guide pulleys 10. FIG. 5 shows three supports 7, but either two or more than three supports are also feasible.

A frame 11 for guide wheels 5–6 is arranged at the far end of the conveyor, and this frame 11 is also provided with guide pulleys 12–13 for the cables 9. These are on the same shaft as the rollers 5–6.

Figure 6:
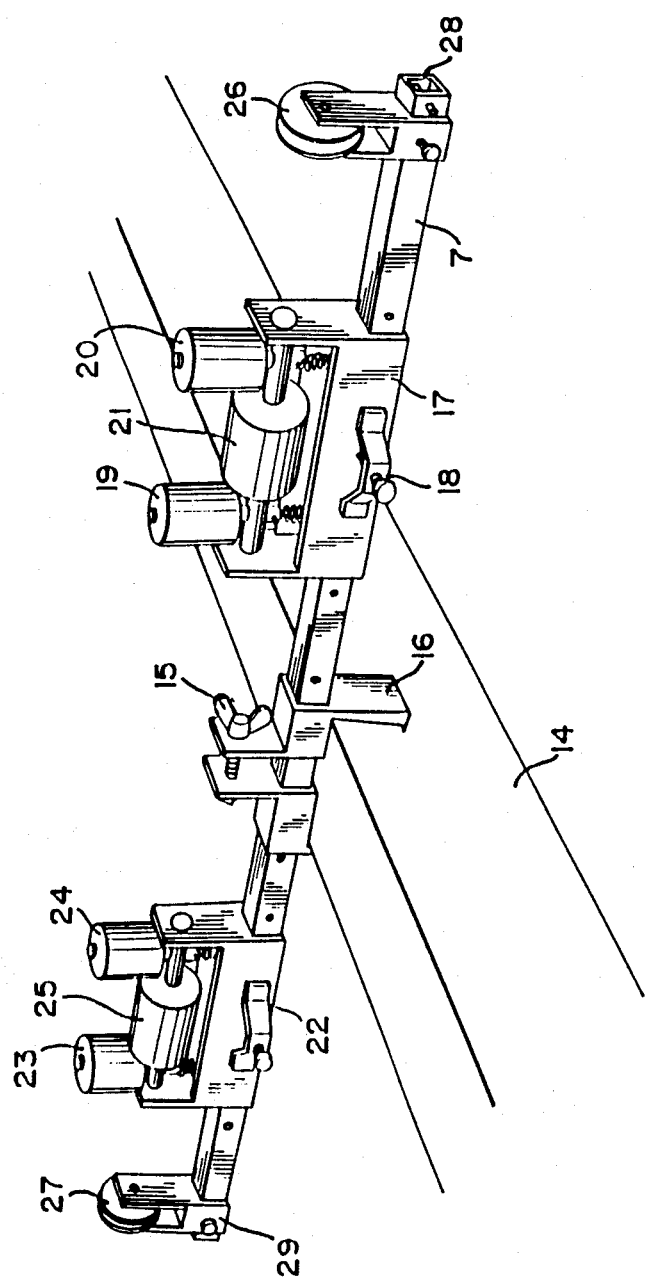
FIG. 6 shows the system with support rollers.

FIG. 6 shows the support 7 in more detail. The stand is clamped on a beam 14 by means of a wing nut 15. It can thus be displaced along the beam 14. A jaws 16, thicker at its lower end is used for clamping the stand. A holder 17 for support rollers can be moved laterally along the support 7 by means of a screw 18 or spring clamps.

The holder 17 carries two vertical support rollers 19–20 and one horizontal support roller 21 for the belt 1. The vertical rollers 19–20 are spring-loaded. A similar holder 22 on the other side of the beam has support rollers 23–24 and 25, respectively. Pulleys 26–27 for support cables are provided at the ends of the support 7, and stops 28–29 outermost.

Figure 7:
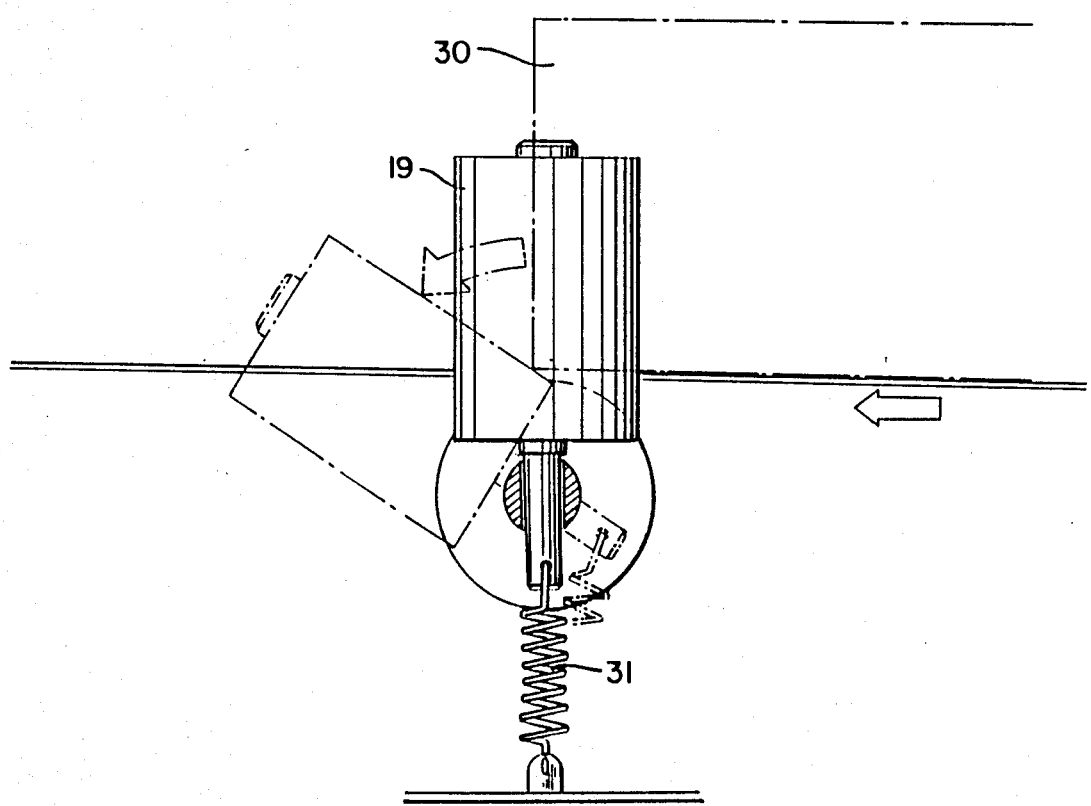
FIG. 7 shows a detail of a vertically positioned support roller.

FIG. 7 shows a detail of the support rollers on the holder 17. Thanks to the spring 31, the vertical rollers 19–20 can be tilted to allow the load 30 to pass.

Figure 8:
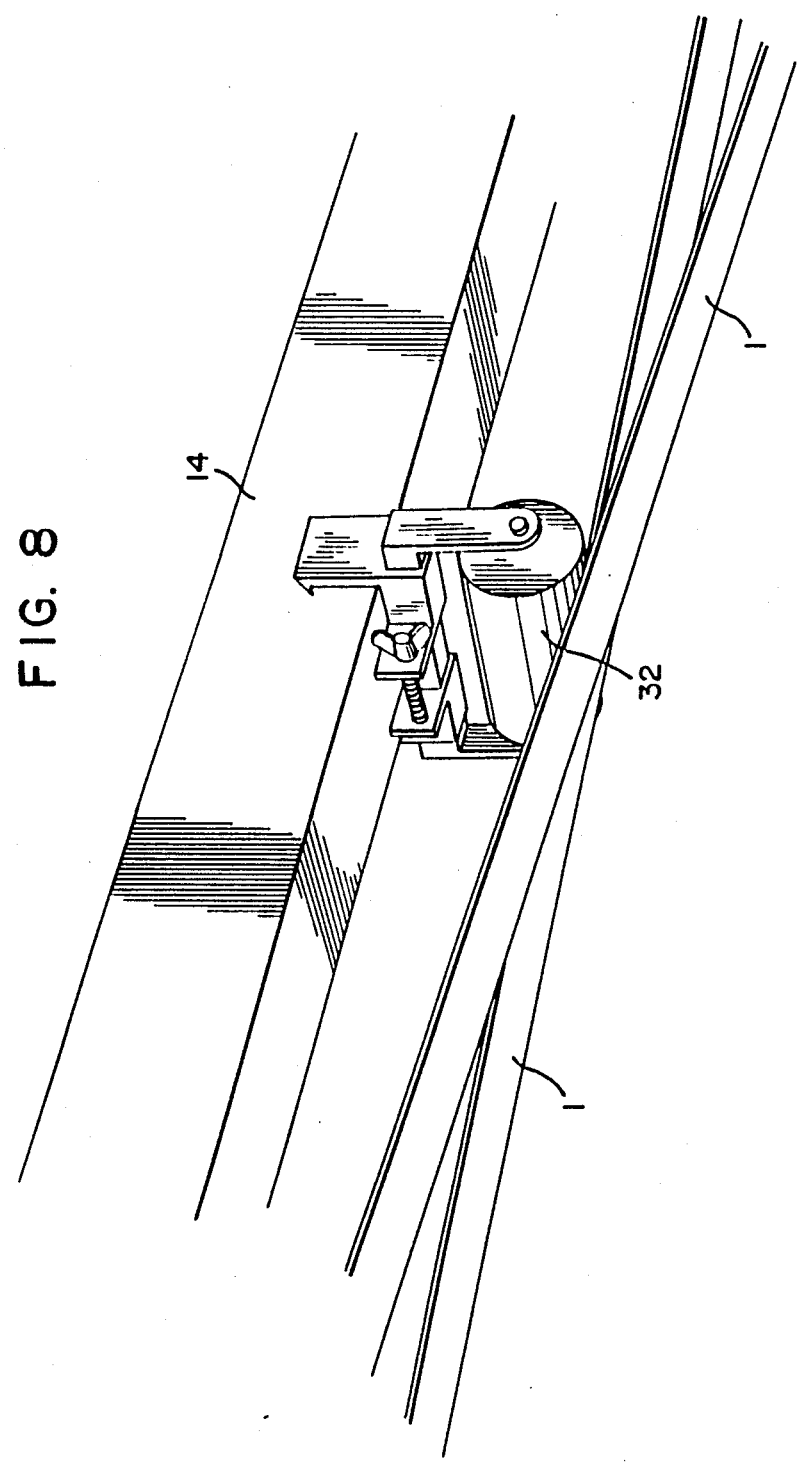
FIG. 8 shows a detail of a support roller located on top of the belt at the crossing.

A lower support wheel 32 is also arranged on the support 7, at the point when the belt crosses. The belt runs below the support roller 32, as shown in FIG. 8. This arrangement enables the belt to be run in both directions to achieve separation. The support roller 32 is sufficiently wide for the two sections of belt to run adjacently. The feeders will separate when the belt has passed the support roller 32.

If necessary, the support roller 32 may be provided with edge flanges to prevent the belt 1 from slipping off.

Figure 9:
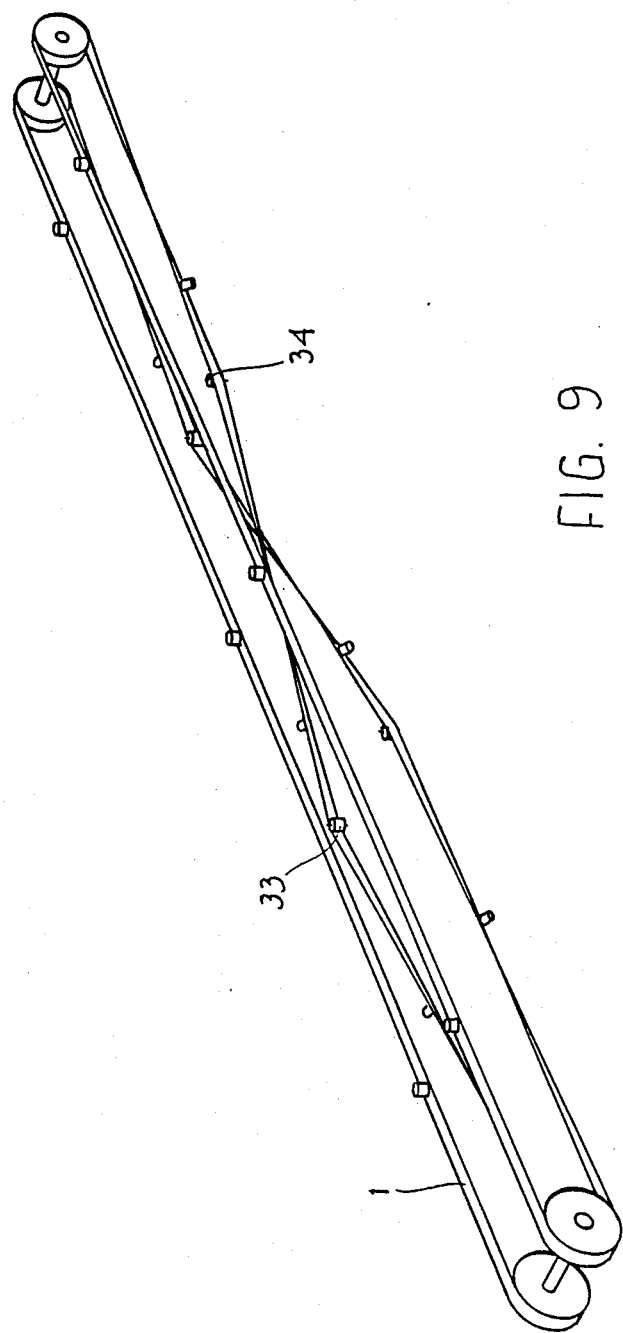
FIG. 9 shows a further arrangement of the belt wherein the lower runs are deflected relative to each other to avoid contact.
Figure 10:
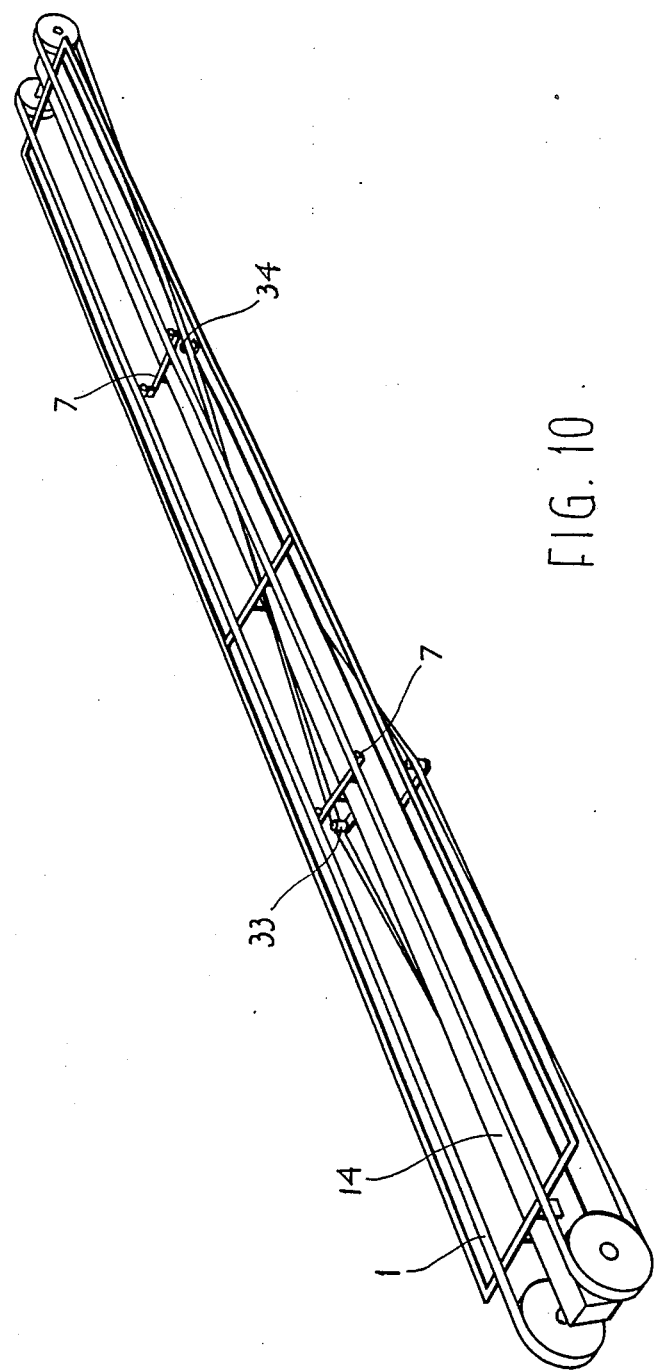
FIG. 10 illustrates the belt system of FIG. 9 along with a schematic presentation of the support and drive system therefor.

Referring now more specifically to FIGS. 9 and 10, the belt arrangement therein differs from that of FIGS. 4 and 5 in that specific provision is made for both vertically separating the lower belt runs and twisting these runs to so space and direct the runs and keepers thereon as to avoid any possibility of interference between the belt runs and keepers as these dual lower belt runs cross each other.

More specifically, the upper dual runs of the belt 1 define the load-supporting surface of the conveyor and run parallel to each other, appropriately supported on horizontal rollers mounted on longitudinally spaced holders 7 which are in turn adjustably mounted to the fixed central body or beam 14.

The dual lower runs of belt 1 cross each other, as in the embodiment of FIGS. 4 and 5. However, in order to avoid any possibility of interference between the dual lower runs, particularly when the belt is provided with load-retaining keepers as best noted in FIG. 9, the dual lower runs are specifically vertically offset or spaced from each other at and for a distance to each side of the crossing area. This vertical spacing of the dual lower runs is simply although uniquely effected by the provision of support rollers 33 and 34 along each lower belt run, positioned to the opposite sides of the central beam 14. The rollers 33 and 34 are longitudinally spaced from each other and longitudinally inward of the drive and guide rollers defining the opposite ends of the conveyor. The support rollers 33 and 34 are substantially vertically oriented and mounted on appropriate holders or supports 7 which are in turn mounted on the central beam 14. The positioning of the support rollers 33 and 34 inward of the end-defining drive and guide rollers allows for an initial parallel extension of the opposed ends of the dual lower runs to insure proper engagement about the drive and guide rollers prior to a crossing of the lower belt runs at an intermediate point along the length of the conveyor. The rollers associated with the upper one of the lower belt runs are so positioned as to upwardly direct this belt run to provide for a positive vertical spacing between the two lower belt runs. This vertical movement of the upper one of the lower belt runs is assisted by various inclined intermediate support rollers. The lowermost of the lower belt runs is also twisted during its path of movement so as to properly engage about the associated pair of vertical rollers 33 and 34 without a vertical shifting of this run. Again, the actual twisting of the run can be facilitated by selected intermediate inclined support rollers. As suggested in FIG. 10, the upper and lower ones of the lower belt runs can actually extend, respectively, above and below the central beam 14.

The invention eliminates the need for electrical or mechanical systems for synchronization and thus also access to a source of electric power, thus offering free choice. This is of course important in the building field. The risk of accidents caused by malfunction of the synchronization system is also eliminated.

Furthermore, the drive rollers need not be exactly the same diameter. Minor differences in diameter will automatically be adjusted after a while, due to wear. Neither are two identical belts necessary.

I claim:

1. A belt conveyor with dual upper runs and dual lower runs for building materials or the like, said conveyor comprising an elongate central body, a conveyor belt, belt drive rollers on said central body and belt guide rollers on the central body remote from the drive rollers, said drive rollers and said guide rollers defining opposed ends of the conveyor, said belt being a single continuous belt defining the dual upper runs and the dual lower runs, each of said runs extending linearly for the length of the conveyor between a drive roller and a guide roller, and guide means for the lower runs positioned to control the crossing of said lower runs to maintain said runs in vertical spaced relation to each other whereby contact therebetween is avoided for movement of each lower run unencumbered by the other crossing lower run, the upper runs extending parallel and generally coplanar to each other, one on each side of the central body, said runs moving synchronously during operation.

2. The belt conveyor of claim 1 including material-engaging keepers mounted on said belt and extending therefrom, the spaced relation between the lower runs being sufficient to avoid contact of the keepers and lower runs.

3. The belt conveyor of claim 2 wherein said guide means includes support rollers supporting each lower run to the opposite sides of the central body, said support rollers directing the respective lower runs across each other and the central body.

4. The belt conveyor of claim 3 wherein the support rollers supporting each lower run are oriented to twist the lower runs to direct the keepers on each lower run outward relative to each other.

5. The belt conveyor of claim 4 wherein said belt is supported by said guide means which is positioned to direct the belt at the crossing point such that one of said lower runs extends above the central body, the other lower run extending below the central body.

6. The belt conveyor of claim 3 wherein said guide means includes multiple support rollers associated with each lower run oriented at varying degrees of inclination relative to the drive and guide rollers to effect a rotational twisting of the lower belt runs and a selected lateral deflection of at least one of the belt runs to define the spaced relation therebetween.

* * * * *